United States Patent
Kulka

(10) Patent No.: US 9,225,236 B2
(45) Date of Patent: Dec. 29, 2015

(54) METHOD FOR CONTROLLING AN H-BRIDGE INVERTER

(71) Applicant: Eltek AS, Drammen (NO)

(72) Inventor: Arkadiusz Kulka, Kristiansand (NO)

(73) Assignee: Eltek AS, Drammen (NO)

(*) Notice: Subject to any disclaimer, the term of this patent is extended or adjusted under 35 U.S.C. 154(b) by 0 days.

(21) Appl. No.: 14/381,220

(22) PCT Filed: Mar. 7, 2013

(86) PCT No.: PCT/EP2013/054603
§ 371 (c)(1),
(2) Date: Aug. 27, 2014

(87) PCT Pub. No.: WO2013/135554
PCT Pub. Date: Sep. 19, 2013

(65) Prior Publication Data
US 2015/0131347 A1    May 14, 2015

Related U.S. Application Data

(60) Provisional application No. 61/609,411, filed on Mar. 12, 2012.

(30) Foreign Application Priority Data

Mar. 12, 2012   (GB) .................................. 1204318.8

(51) Int. Cl.
H02M 7/5387    (2007.01)
H02M 1/42      (2007.01)
H02M 7/5395    (2006.01)

(52) U.S. Cl.
CPC .......... *H02M 1/4233* (2013.01); *H02M 7/5387* (2013.01); *H02M 7/5395* (2013.01); *H02M 7/53871* (2013.01)

(58) Field of Classification Search
CPC .......... H02M 3/33569; H02M 3/3376; H02M 3/33507; H02M 7/53871; H02M 7/537; H02M 7/5387
USPC ........................... 363/16, 17, 95, 98, 131, 132
See application file for complete search history.

(56) References Cited

U.S. PATENT DOCUMENTS 4,710,686 A * 12/1987 Guzik ........................... 318/293
5,379,209 A *  1/1995 Goff ............................. 363/132

(Continued)

FOREIGN PATENT DOCUMENTS

JP       64055079     4/1989
WO      2010130273    11/2010

OTHER PUBLICATIONS

GB Search report of Jul. 10, 2012, submitted, inter alia, as statement of relevance for non-English references citedgthrerein.

*Primary Examiner* — Adolf Berhane
(74) *Attorney, Agent, or Firm* — Christian D. Abel

(57) ABSTRACT

The invention relates to a H-bridge inverter and a method for controlling a H-bridge converter. The H-bridge inverter (1) comprises first and second DC terminals (Tdc1, Tdc2), first and second AC terminals (Tac1, Tac2), a first switch (S1), a second switch (S2), a third switch (S3) and a fourth switch (S4). The inverter further comprises a control circuit for controlling the switching of the first, second, third and fourth switches (S11, S2, S3, S4). The control circuit is configured to control the switches (S1, S2, S3, S4) in continuous mode between the following states: a first state where the first switch (S1) is turned off, the second switch (S2) is performing PWM switching, the third switch (S3) is turned off and the fourth switch (S4) is turned on; a second state where the first switch (S1) is turned off, the second switch (S2) is performing PWM switching, the third switch (S3) is turned on and the fourth switch (S4) is turned off; a third state where the first switch (S1) is turned off, the second switch (S2) is turned on, the third switch (S3) is turned off and the fourth switch (54) is performing PWM switching; and a fourth state where the first switch (S1) is turned on, the second switch (S2) is turned off, the third switch (S3) is turned off and the fourth switch (S4) is performing PWM switching.

5 Claims, 4 Drawing Sheets

(56) References Cited

U.S. PATENT DOCUMENTS

| | | | |
|---|---|---|---|
| 5,493,487 A * | 2/1996 | Close et al. | 363/132 |
| 5,859,519 A * | 1/1999 | Archer | 318/801 |
| 6,130,831 A * | 10/2000 | Matsunaga | 363/98 |
| 6,654,261 B2 * | 11/2003 | Welches et al. | 363/41 |
| 6,927,989 B2 * | 8/2005 | Fukumoto | 363/95 |
| 8,811,039 B2 * | 8/2014 | The Ngo et al. | 363/21.02 |
| 2006/0018139 A1 * | 1/2006 | Kolomeitsev et al. | 363/132 |
| 2010/0171480 A1 | 7/2010 | Ye et al. | |

* cited by examiner

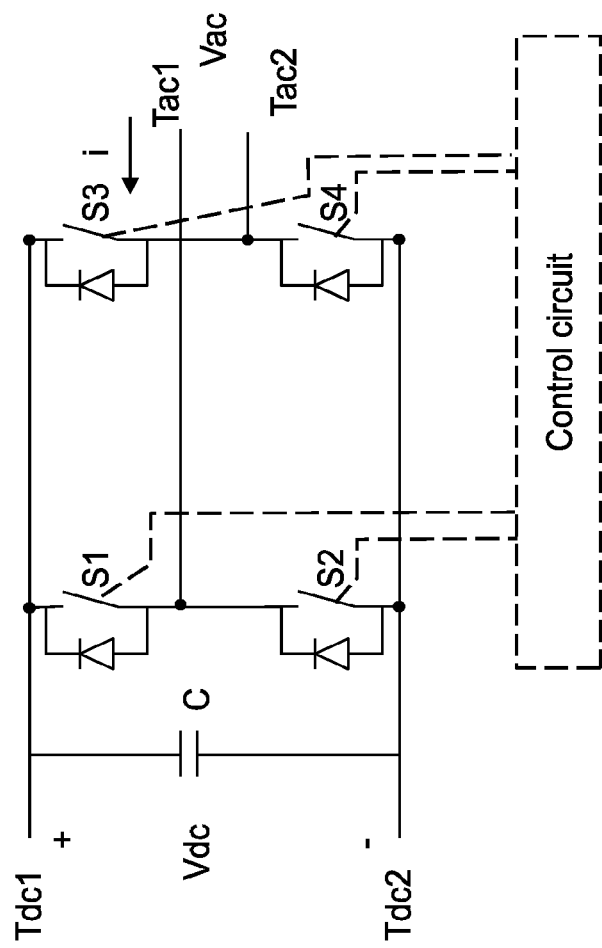
Fig. 1: Prior art

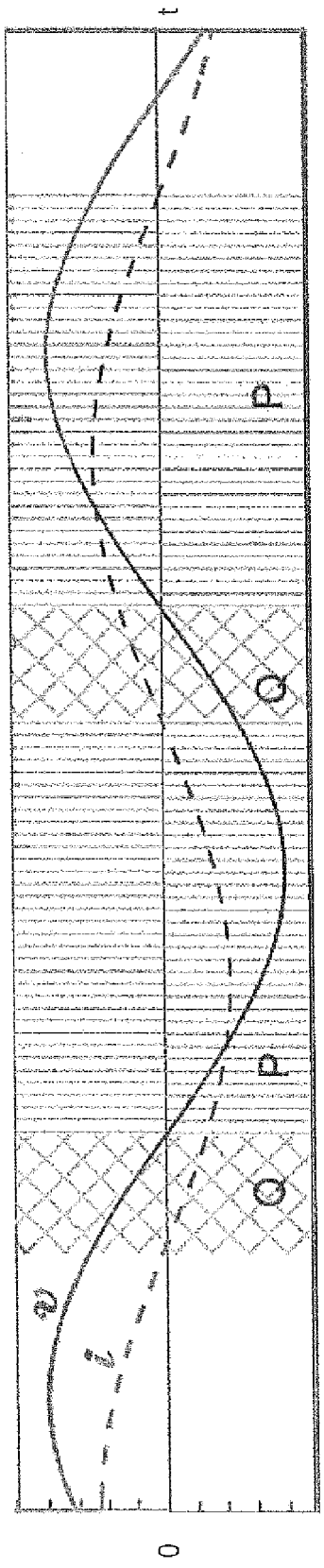
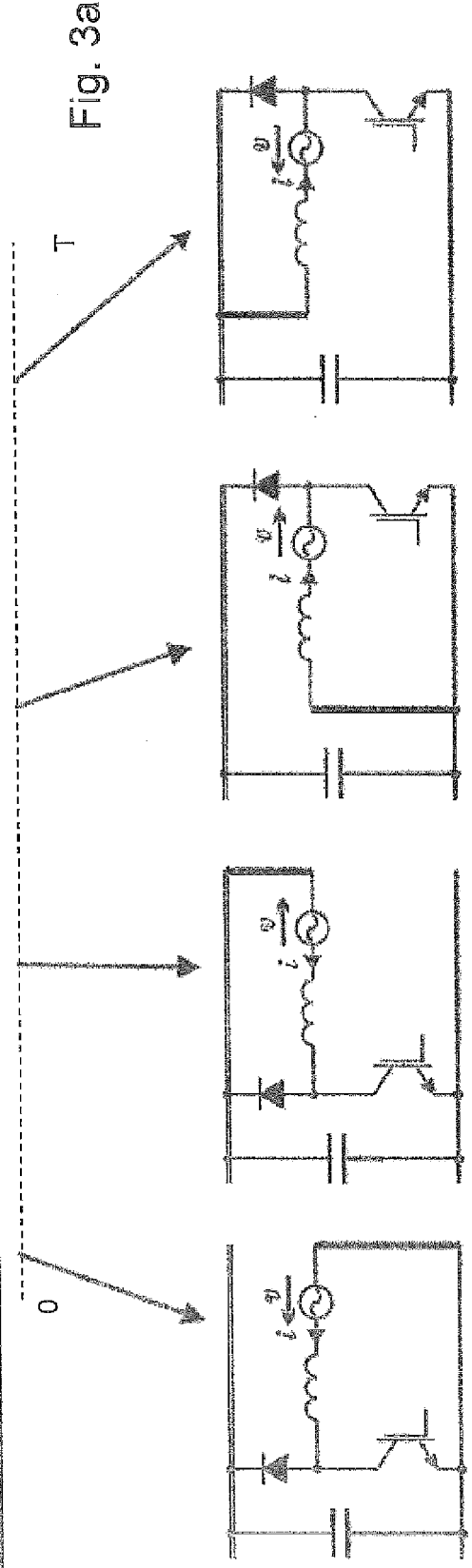
Fig. 3a
Fig. 3b
Fig. 3c
Fig. 3d
Fig. 3e

METHOD FOR CONTROLLING AN H-BRIDGE INVERTER

FIELD OF THE INVENTION

The present invention relates to an H-bridge inverter and a method for controlling a H-bridge inverter.

BACKGROUND OF THE INVENTION

A DC-AC converter is commonly referred to as an inverter. One type of inverter is known as a single phase H-bridge inverter, comprising two DC terminals Tdc1, Tdc2, two AC terminals Tac1, Tac2 and four switches S1, S2, S3 and S4 in the configuration shown in FIG. 1. In most configurations, the switches are transistors with intrinsic diodes, alternatively diodes separate from the switches may be used. In FIG. 1, both the switches and the diodes are illustrated. A corresponding three phase H-bridge inverter is also known.

One common way of controlling the switches of the inverter in FIG. 1 is to use pulse-width modulation (PWM) switching. Here, a first pair of opposite switches (S1 and S4) is controlled by PWM switching and a second pair of opposite switches (S2 and S3) is turned off for one switching period and vice versa for the next switching period.

The inverter can be connected to an AC grid, typically when the inverter is used to convert DC power from solar power systems and then supplied to the AC grid. Here, the AC frequency and voltage amplitude is determined by the AC grid and the inverter is controlling the output current.

The inverter can also be connected to an AC load, typically when the inverter is used in an uninterruptable power supply (UPS) for converting DC power from a battery to a load requiring an AC voltage. Here, the current is determined by the load and the inverter is controlling the output voltage.

It is an object of the invention to achieve an inverter where it is possible to adjust the cosine phi of the AC terminals, while still achieve a high efficiency. Moreover, it is an object to adjust the flow of reactive power between the inverter and the AC side in both directions, i.e. the inverter may either consume or supply the reactive power.

SUMMARY OF THE INVENTION

The present invention relates to a H-bridge inverter, where the H-bridge inverter comprises:
- first and second DC terminals;
- first and second AC terminals;
- a first switch connected between the first DC terminal and the first AC terminal;
- a second switch connected between the first AC terminal and the second DC terminal;
- a third switch connected between the first DC terminal and the second DC terminal;
- a fourth switch connected between the second AC terminal and the second DC terminal;
- a control circuit for controlling the switching of the first, second, third and fourth switches;

where the first, second, third and fourth switches comprises anti-parallel diodes or is connected in parallel with anti-parallel diodes; characterized in that the control circuit is configured to control the switches in continuous mode between the following states:
- a first state where the first switch is turned off, the second switch is performing PWM switching, the third switch is turned off and the fourth switch is turned on;
- a second state where the first switch is turned off, the second switch is performing PWM switching, the third switch is turned on and the fourth switch is turned off;
- a third state where the first switch is turned off, the second switch is turned on, the third switch is turned off and the fourth switch is performing PWM switching;
- a fourth state where the first switch is turned on, the second switch is turned off, the third switch is turned off and the fourth switch is performing PWM switching.

In one aspect of the invention, the control circuit is configured to control the switches in sequence between the first state, the second state, the third state, the fourth state and then the first state again when it is detected that the AC current has a phase lead over the AC voltage.

In one aspect of the invention, the control circuit is configured to control the switches in sequence between the third state, the second state, the first state, the fourth state and then the third state again when it is detected that the AC current has a phase lag over the AC voltage.

In one aspect of the invention, the inverter is a single-phase H-bridge inverter.

The present invention also relates to a method for controlling a H-bridge inverter, where the H-bridge inverter comprises
- first and second DC terminals;
- first and second AC terminals;
- a first switch connected between the first DC terminal and the first AC terminal;
- a second switch connected between the first AC terminal and the second DC terminal;
- a third switch connected between the first DC terminal and the second DC terminal;
- a fourth switch connected between the second AC terminal and the second DC terminal;

where the method comprises the steps of:
- in a first time period, turning off the first switch, performing PWM switching by means of the second switch, turning off the third switch and turning on the fourth switch;
- in a second time period, turning off the first switch, performing PWM switching by means of the second switch, turning on the third switch and turning off the fourth switch;
- in a third time period, turning off the first switch, turning on the second switch, turning off the third switch and performing PWM switching by means of the fourth switch;
- in a fourth time period, turning on the first switch, turning off the second switch, turning off the third switch and performing PWM switching by means of the fourth switch.

DETAILED DESCRIPTION

Embodiments of the invention will now be described in detail with reference to the enclosed drawings, where:

FIG. 1 illustrates a prior art single phase H-bridge inverter;

FIG. 2a illustrates the different states of the switches in the single phase H-bridge inverter according to the invention, where the inverter is connected to an AC grid;

FIG. 2b illustrates a simplified drawing of FIG. 2a;

FIG. 3a illustrates the voltage and current of FIG. 2a for different states of the single phase H-bridge inverter where inductive reactive power is supplied to the AC grid;

FIGS. 3b, 3c, 3d and 3e illustrate the different states of the single phase H-bridge inverter for the voltage and current of FIG. 3a;

FIGS. 4b, 4c, 4d and 4e illustrate the different states of the single phase H-bridge inverter for the voltage and current of FIG. 4a;

Figures 2A, 2B:
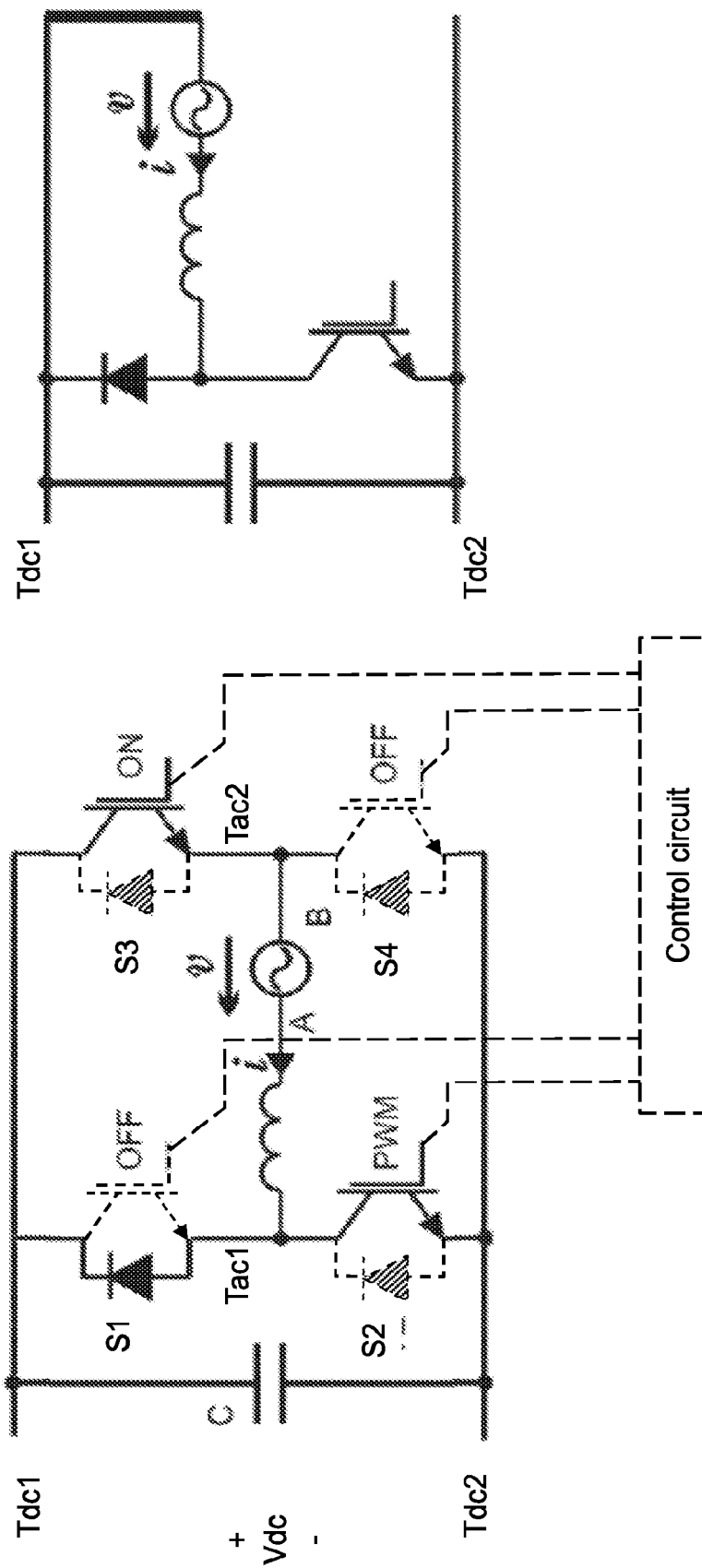

It is now referred to FIG. 2a, illustrating an H-bridge inverter 1. The H-bridge inverter 1 comprises first and second DC terminals Tdc1, Tdc2 and first and second AC terminals Tac1, Tac2. In FIG. 2a, the AC side is the AC mains represented by a voltage source v and an inductor provided between the AC terminals Tac1, Tac2. The current i is also indicated by an arrow. The typical application of the inverter in FIG. 2a is to invert a DC power from for example solar cell systems to AC power. Here, the AC frequency and voltage amplitude is determined by the AC grid and the inverter is controlling the output current, i.e. both the current amplitude and the current phase displacement in relation to the voltage.

As mentioned in the introduction above, a load could also be connected between the AC terminals Tac1, Tac2. The typical application of the inverter would then be an inverter of an uninterrupted power supply (UPS), where DC power from a battery is converted to an AC power of predetermined frequency and amplitude (typically 230 V AC at 50 Hz) load, where the current is determined by the load. The load may be a computer server, telecommunication equipment, etc.

The H-bridge inverter 1 comprises four switches S1, S2, S3 and S4. The first switch S1 is connected between the first DC terminal Tdc1 and the first AC terminal Tac1. The second switch S2 is connected between the first AC terminal Tac1 and the second DC terminal Tdc2. The third switch S3 is connected between the first DC terminal Tdc1 and the second DC terminal Tdc2. The fourth switch S4 is connected between the second AC terminal Tac2 and the second DC terminal Tdc2.

The first, second, third and fourth switches S1, S2, S3, S4 each comprise anti-parallel diodes or is connected in parallel with anti-parallel diodes.

The H-bridge inverter 1 may further comprise a capacitor C connected between the first and second DC input terminals Tdc1, Tdc2.

The H-bridge inverter 1 further comprises a control circuit for controlling the switching of the first, second, third and fourth switches S1, S2, S3, S4.

In FIG. 2a, the different states of the switches during a switching period are illustrated. The first switch S1 is turned off, but the anti-parallel diode of the first switch S1 is conducting. The second switch S2 is performing pulse-width-modulation (PWM) switching. The third switch S3 is turned on. The fourth switch S4 is turned off, and the anti-parallel diode of the first switch is not conducting.

FIG. 2b shows a simplified version of FIG. 2a, where the non-active parts (indicated by a grey color in FIG. 2a) of the first and second switches S1, S2 is removed, where the conducting third switch S3 is replaced by a conductor and where the non-conducting fourth switch S4 is removed. In FIGS. 3a-e and FIGS. 4a-e, the states are shown as in FIG. 2b.

Example 1

Inverter Supplying Inductive Reactive Power to the AC Grid

It is now referred to FIG. 3a. Here, the curves representing the voltage v and the current i are plotted along a horizontal time axis. As shown, the current has a phase lead over the voltage. Moreover, the curves in FIG. 3a show continuous mode of operation for the H-bridge inverter. The continuous mode of operation is the typical mode of operation.

In FIG. 3a, the areas denoted with letter Q are indicating the time of the switching period T in which reactive power is supplied to the AC mains. The areas denoted with letter P are indicating the time of the switching period T in which active power is supplied to the AC mains.

As shown in FIG. 4b-4e, the control circuit is configured to control the switches in continuous mode between the following states 1-4:

1) a first state (FIG. 3b) where the first switch S1 is turned off, the second switch S2 is performing PWM switching, the third switch S3 is turned off and the fourth switch S4 is turned on. Here, the anti-parallel diode of the first switch S1 is conducting. Here, reactive power is supplied to the AC mains.

2) a second state (FIG. 3c) where the first switch S1 is turned off, the second switch S2 is performing PWM switching, the third switch S3 is turned on and the fourth switch S4 is turned off. Here, the anti-parallel diode of the first switch S1 is conducting. Here, active power is supplied to the AC mains.

3) a third state (FIG. 3d) where the first switch S1 is turned off, the second switch S2 is turned on, the third switch S3 is turned off and the fourth switch S4 is performing PWM switching. Here, the anti-parallel diode of the third switch S3 is conducting. Here, reactive power is supplied to the AC mains.

4) a fourth state (FIG. 3e) where the first switch S1 is turned on, the second switch S2 is turned off, the third switch S3 is turned off and the fourth switch S4 is performing PWM switching. Here, the anti-parallel diode of the third switch S3 is conducting. Here, active power is supplied to the AC mains.

In the above example, the control circuit is configured to control the switches in the above sequence, i.e. first state 1, then state 2, then state 3, then state 4 and then state 1 again. In the above example inductive reactive power is supplied to the AC grid.

It should be noted that the H-bridge inverter sometimes must be controlled in so-called discontinuous mode, which is performed when the amount of energy required to be transferred to the AC mains is so small that the time required to transfer is less than one switching period. It should be noted that the present invention is related to the control circuit and how the control circuit is configured to control the switches in continuous mode. The control of the switches in an H-bridge inverter in discontinuous mode is considered known for a skilled person. During the periods with supply of active power P in FIG. 3a, the H-bridge inverter is similar to a step-down converter, and the inverter according to the present invention is in discontinuous mode controlled in similar way as the prior art step-down converter, for example as described in "Power Electronics, Converters Application and Design" by Mohan, Undeland and Robbins, $2^{nd}$ edition, chapter 8-2-1 and chapter 8-3-2, where it referred to chapter 7-3 (step-down converter).

During the periods with supply of reactive power Q in FIG. 3a, the H-bridge is similar to a step-up converter, and the inverter according to the present invention is in discontinuous mode controlled in similar way as the prior art step-up converter, for example as described in the above reference, chapter 7-4 (step-up converter).

Consequently, controlling the H-bridge inverter in discontinuous mode is considered to be prior art.

Example 2

Inverter Supplying Capacitive Reactive Power to the AC Grid

Figure 4A:
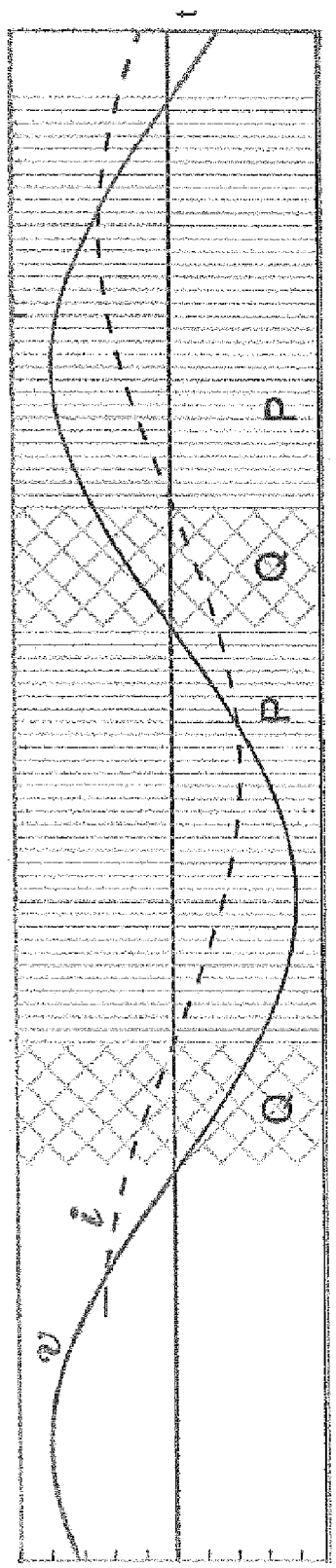
FIG. 4a illustrates the voltage and current of FIG. 2a for different states of the single phase H-bridge inverter where capacitive reactive power is supplied to the AC grid.
Figure 4E:
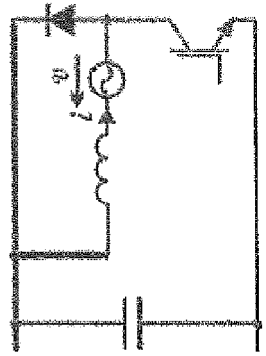
Figure 4D:
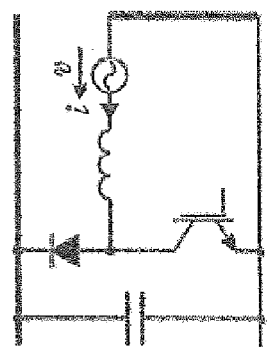
Figure 4C:
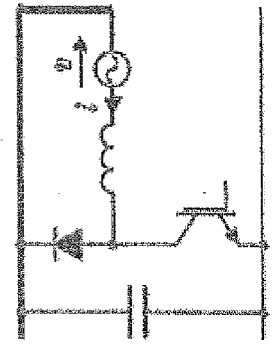
Figure 4B:
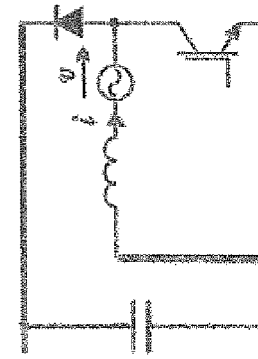

It is now referred to FIG. 4a. Again, the curves representing the voltage v and the current i are plotted along a horizontal time axis. As shown, the voltage has a phase lag over the current. As in the above example, the curves in FIG. 3a show continuous mode of operation for the H-bridge inverter.

As shown in FIG. 4b-4e, the control circuit is configured to control the switches in continuous mode between the above-mentioned states 1-4. However, here the control circuit is configured to control the switches between the states 1-4 in a different sequence, i.e. first state 3 (FIG. 4a), then state 2 (FIG. 4b), then state 1 (FIG. 3d), then state 4 (FIG. 4e) and then state 3 again. In the above example capacitive reactive power is supplied to the AC grid.

Hence, the same electrical components are used and the control circuit is controlling the switches between the same states, the only difference from example 1 is that the control circuit is changing the sequence of the states.

It should be noted that in example 2, the control circuit may control the inverter in discontinuous mode. Again, this is considered known for a skilled person, as mentioned above.

In prior art the PWM switching occurs at least at two or more switches in order to supply reactive power. Here, active/reactive power is controlled with only one PWM switch and another switch is controlled with 50 Hz/60 Hz grid frequency. Hence, less switching losses is achieved.

The invention claimed is:

1. H-bridge inverter, comprising:
   first and second DC terminals (Tdc1, Tdc2);
   first and second AC terminals (Tac1, Tac2);
   a first switch (S1) connected between the first DC terminal (Tdc1) and the first AC terminal (Tac1);
   a second switch (S2) connected between the first AC terminal (Tac1) and the second DC terminal (Tdc2);
   a third switch (S3) connected between the first DC terminal (Tdc1) and the second DC terminal (Tdc2);
   a fourth switch (S4) connected between the second AC terminal (Tac2) and the second DC terminal (Tdc2);
   a control circuit for controlling the switching of the first, second, third and fourth switches (S1, S2, S3, S4);
   wherein the first, second, third and fourth switches (S1, S2, S3, S4) comprise anti-parallel diodes or are connected in parallel with anti-parallel diodes;
   and further wherein the control circuit is configured to control the switches (S1, S2, S3, S4) in continuous mode between four states, said states consisting of:
   a first state where the first switch (S1) is turned off, the second switch (S2) is performing PWM switching, the third switch (S3) is turned off and the fourth switch (S4) is turned on;
   a second state where the first switch (S1) is turned off, the second switch (S2) is performing PWM switching, the third switch (S3) is turned on and the fourth switch (S4) is turned off;
   a third state where the first switch (S1) is turned off, the second switch (S2) is turned on, the third switch (S3) is turned off and the fourth switch (S4) is performing PWM switching;
   a fourth state where the first switch (S1) is turned on, the second switch (S2) is turned off, the third switch (S3) is turned off and the fourth switch (S4) is performing PWM switching.

2. H-bridge inverter according to claim 1, where the control circuit is configured to control the switches (S1, S2, S3, S4) in sequence between the first state, the second state, the third state, the fourth state and then the first state again when it is detected that the AC current has a phase lead over the AC voltage.

3. H-bridge inverter according to claim 1, where the control circuit is configured to control the switches (S1, S2, S3, S4) in sequence between the third state, the second state, the first state, the fourth state and then the third state again when it is detected that the AC current has a phase lag over the AC voltage.

4. H-bridge inverter according to any one of claims 1-3, where the inverter is a single-phase H-bridge inverter.

5. Method for controlling a H-bridge inverter, where the H-bridge inverter comprises
   first and second DC terminals (Tdc1, Tdc2);
   first and second AC terminals (Tac1, Tac2);
   a first switch (S1) connected between the first DC terminal (Tdc1) and the first AC terminal (Tac1);
   a second switch (S2) connected between the first AC terminal (Tac1) and the second DC terminal (Tdc2);
   a third switch connected between the first DC terminal (Tdc1) and the second DC terminal (Tdc2);
   a fourth switch (S4) connected between the second AC terminal (Tac2) and the second DC terminal (Tdc2);
   where the method comprises the steps of:
   in a first time period, turning off the first switch (S1), performing PWM switching by means of the second switch (S2), turning off the third switch (S3) and turning on the fourth switch (S4);
   in a second time period, turning off the first switch (S1), performing PWM switching by means of the second switch (S2), turning on the third switch (S3) and turning off the fourth switch (S4);
   in a third time period, turning off the first switch (S1), turning on the second switch (S2), turning off the third switch (S3) and performing PWM switching by means of the fourth switch (S4);
   in a fourth time period, turning on the first switch (S1), turning off the second switch (S2), turning off the third switch (S3) and performing PWM switching by means of the fourth switch (S4).

* * * * *